J. ROEMER.
GRAIN DRILL.
APPLICATION FILED JULY 15, 1912. RENEWED MAY 7, 1914.

1,120,087.  Patented Dec. 8, 1914.

Inventor
J. Roemer

UNITED STATES PATENT OFFICE.

JOSEPH ROEMER, OF SANTA MARIA, CALIFORNIA.

GRAIN-DRILL.

1,120,087.   Specification of Letters Patent.   Patented Dec. 8, 1914.

Application filed July 15, 1912, Serial No. 709,491. Renewed May 7, 1914. Serial No. 837,072.

*To all whom it may concern:*

Be it known that I, JOSEPH ROEMER, citizen of the United States, residing at Santa Maria, in the county of Santa Barbara and State of California, have invented certain new and useful Improvements in Grain-Drills, of which the following is a specification.

This invention relates to grain drills, and has as its object to provide for a more perfect placing of the grain in the furrow than is accomplished by the use of the ordinary grain drills, furrow openers and closers.

The invention contemplates the provision, in connection with a specially constructed boot of disks so relatively arranged as to press aside the walls of the furrow and form a relatively deep and narrow channel in which the seeds are deposited.

The invention also contemplates the provision in connection with the disks of means for scraping the disks and for holding them against separation.

For a full understanding of the invention reference is to be had to the following description and accompanying drawing, in which:—

Figure 1:
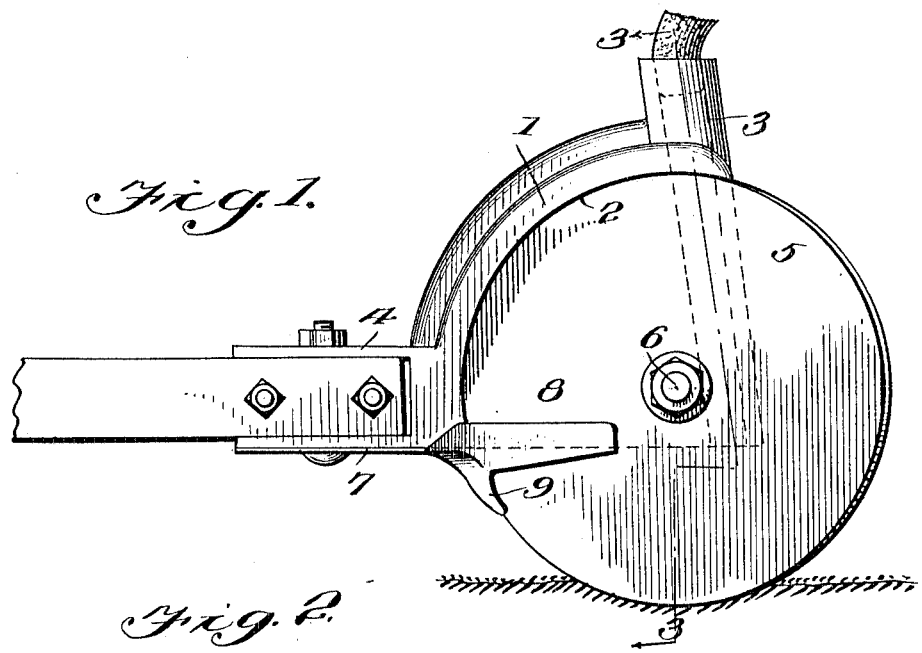
Figure 2:
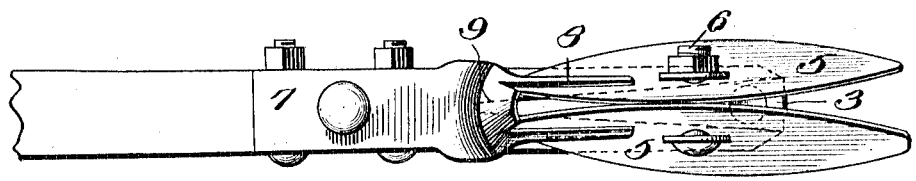
Figure 3:
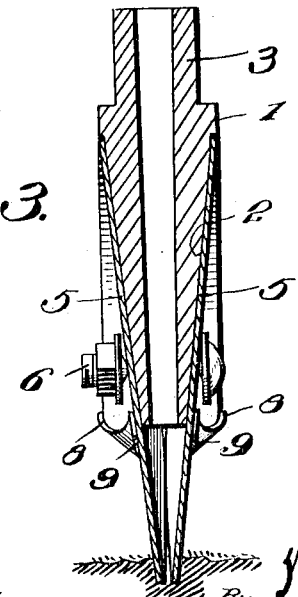

Figure 1 is a side elevation of the furrow opening and seed depositing mechanism embodying the present invention. Fig. 2 is a bottom plan view thereof. Fig. 3 is a vertical transverse sectional view on the line 3—3 of Fig. 1.

Corresponding and like parts are referred to in the following description and indicated in all the views of the accompanying drawing by the same reference characters.

In the drawing the boot is illustrated as consisting of a body 1 which is of segmental form and has side faces 2 which are located in planes converging downwardly and forwardly with respect to each other. In other words the rear sides of the body 1 decrease in width toward the lower side thereof and the last mentioned side of the body 1 is decreased in width in a forward direction. The body adjacent its rear side is formed or provided with a seed tube 3 through which the seed to be planted are fed. A relatively short shank 4 projects from the forward side of the body 1 and serves as a means whereby the device may be attached to the frame of the planter in connection with which it is used.

It will be understood that the seed to be planted are delivered to the feed tube free of the boot from the feed box of the planter in any suitable manner and they are dropped from the lower end of this tube and between the disks which are constructed and arranged in a manner which will now be explained. Each of the disks is indicated by the numeral 5 and is flat-sided and circular. These disks are disposed one against each side face of the body 1 and a spindle 6 is fitted axially through the disks and through the said body in advance of the feed tube 3, the disks being in this manner mounted for rotation. By referring to Figs. 2 and 3 of the drawing it will be observed that the opposing faces of the disks 5 are disposed flat against the sides 2 of the body 1 and consequently are positioned in planes inclined downwardly and forwardly toward each other, the disks at their lower forward sides having their peripheries in contact as shown in Figs. 2 and 3 of the drawings.

It will be observed that the point of contact of the peripheries of the disks, is located slightly in advance of the discharge end of the feed tube 3 and consequently, as the opener disks travel through the furrow, the walls of the furrow will be pressed aside and the disks at their lower forward portions will form a relatively deep and narrow channel in the bottom of the furrow into which channel the seed will be dropped from the said tube. In this manner, proper placing of the seed in the furrow is insured.

Secured to the under side of the shank 4 is a plate 7 formed with rearwardly projecting scraper blades 8, these blades extending rearwardly beside the disks 5 in a manner clearly shown in the several figures of the drawing and being located in planes corresponding to those occupied by the said disks. In order to close the space between the peripheries of the disk in advance of their mating portions, and between this point and the rear end of the shank 4, the plate is formed, between the scraper blades 8 with a depending apron 9 which is transversely curved so as to fit the forward edges of the disks at the points stated and partly embrace the sides thereof, whereby to practically completely close the space mentioned. The scraper blades 8 serve not only to scrape the outer surface of the disks 5 but serve also as a means for preventing spreading apart or separation of the disks at their forward portions as they travel in the furrow. The apron 9 also serves this latter function in preventing the entrance of the soil between the forward sides of the disks.

Having thus described the invention what is claimed as new is:—

In a seed drill of the class described, a body of segmental form having its side faces located in planes converging downwardly and forwardly with respect to each other, a seed tube supported by the body at the rear thereof, a shank projecting from the forward side of the body at the lower end thereof, flat sided disks disposed against the faces of the body, a spindle fitted through the disks and through the body, the spindle being located in advance of the lower end of the seed tube and the disks being in contact at their edges below and forwardly of the spindle, and a plate secured to the under side of the shank and having its intermediate portion struck down to form a rearwardly and downwardly extending transversely curved apron extending over the edges of the disks above and in advance of their portions which are in contact with each other, the side portions of the plate being extended rearwardly beyond the said apron and beside the disks and having their upper edges in contact with the outer faces of the disks, said side portions lying in downwardly diverging planes.

In testimony whereof I affix my signature in presence of two witnesses.

JOSEPH ROEMER. [L. S.]

Witnesses:
 PERCIE JENKINS,
 THOS. B. ADAM.

Copies of this patent may be obtained for five cents each, by addressing the "Commissioner of Patents, Washington, D. C."